US012512673B2

(12) United States Patent
Chen et al.

(10) Patent No.: US 12,512,673 B2
(45) Date of Patent: Dec. 30, 2025

(54) INVERTER PARALLEL SYSTEM AND ZERO FEED-IN CONTROL METHOD THEREFOR

(71) Applicants:Wanbang Digital Energy Co., Ltd., Jiangsu (CN); Wanbang Star Charge Technology Ltd., Jiangsu (CN)

(72) Inventors: Shen Chen, Jiangsu (CN); Xuancai Zhu, Jiangsu (CN)

(73) Assignees: Wanbang Digital Energy Co., Ltd., Jiangsu (CN); Wanbang Star Charge Technology Ltd., Jiangsu (CN)

( * ) Notice: Subject to any disclaimer, the term of this patent is extended or adjusted under 35 U.S.C. 154(b) by 864 days.

(21) Appl. No.: 17/844,069

(22) Filed: Jun. 20, 2022

(65) Prior Publication Data

US 2023/0042950 A1 Feb. 9, 2023

(30) Foreign Application Priority Data

Aug. 6, 2021 (CN) .......................... 202110900534.X

(51) Int. Cl.
*H02J 3/32* (2006.01)
*H02J 3/38* (2006.01)
*H02J 7/00* (2006.01)

(52) U.S. Cl.
CPC ................. *H02J 3/32* (2013.01); *H02J 3/381* (2013.01); *H02J 7/00714* (2020.01); *H02J 2300/26* (2020.01)

(58) Field of Classification Search
CPC .......... H02J 3/32; H02J 3/381; H02J 7/00714; H02J 2300/26; H02J 2300/28; Y02E 10/56; Y02E 70/30

(Continued)

(56) References Cited

U.S. PATENT DOCUMENTS 11,264,807 B2 * 3/2022 White ..................... B60L 53/51
11,916,383 B2 * 2/2024 Buttgenbach ........... H02S 40/38
(Continued)

OTHER PUBLICATIONS

"Office Action of China Counterpart Application", with English translation thereof, issued on May 21, 2023, p. 1-p. 5.
(Continued)

*Primary Examiner* — Daniel Kessie
(74) *Attorney, Agent, or Firm* — JCIPRNET

(57) ABSTRACT

An inverter parallel system and a zero feed-in control method for the inverter parallel system are provided. The system includes at least one first inverter, at least one second inverter, a load, an electrical grid, a controller, and an electrical parameter measuring device. The controller includes a system control module, and the first inverter includes an inverter control module. The system control module is configured to determine a battery power reference value of an energy storage battery according to an electrical grid current reference value and an electrical grid current sampling value. The inverter control module is configured to control the first inverter, such that a feed-in current flowing into the electrical grid side is zero, and the second inverter operates in a maximum power point tracking state. Therefore, in the system, zero feed-in control may be achieved without energy management and without communication between inverters. Therefore, the need for installation of communication lines in the conventional wired communication is eliminated, system costs and installation difficulty are reduced, and the system can operate in the optimal state.

5 Claims, 9 Drawing Sheets

(58) Field of Classification Search
USPC .......................................................... 320/101
See application file for complete search history.

(56) References Cited

U.S. PATENT DOCUMENTS

| | | | |
|---|---|---|---|
| 11,916,389 B2* | 2/2024 | Nishio | H02J 3/322 |
| 2017/0047740 A1 | 2/2017 | Narla | |
| 2017/0104337 A1* | 4/2017 | Drees | H02J 3/381 |
| 2020/0177008 A1* | 6/2020 | Tiedtke | B60L 5/24 |

OTHER PUBLICATIONS

"Search Report of Europe Counterpart Application", issued on Jan. 31, 2023, p. 1-p. 6.

* cited by examiner

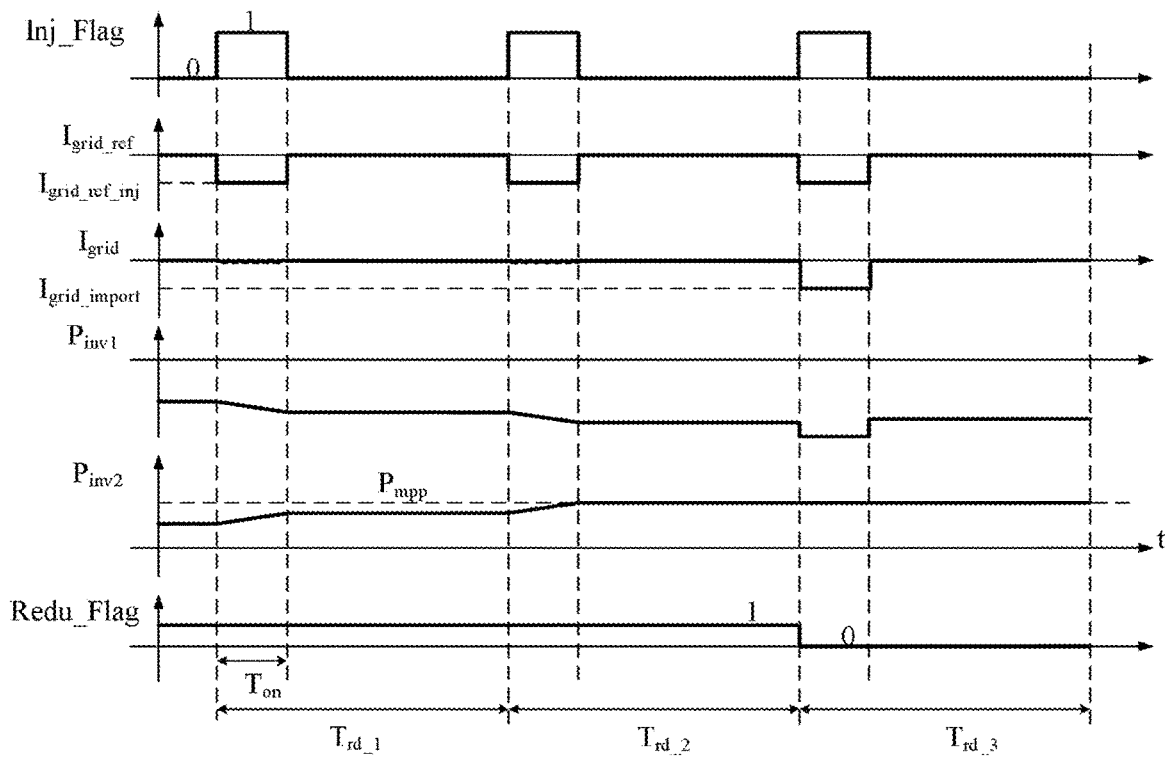

FIG. 11

| | |
|---|---|
| Determining a first inverter connected to an energy storage battery and a second inverter connected to a renewable energy power generation device in the inverter parallel system | S1 |
| Obtaining an electrical grid current reference value, an electrical grid current sampling value, a battery power sampling value, and an output current sampling value of the first inverter, wherein the electrical grid current reference value is a periodic pulse sequence with an adjustable duty cycle and amplitude | S2 |
| Determining a battery power reference value of the energy storage battery according to the electrical grid current reference value and the electrical grid current sampling value | S3 |
| Determining a battery power reference value of the energy storage battery according to the electrical grid current Controlling the first inverter according to the battery power reference value, the battery power sampling value, and the output current sampling value, such that a feed-in current flowing into the electrical grid side is zero, and the second inverter operates in a maximum power point tracking state value and the electrical grid current sampling value | S4 |

FIG. 12

INVERTER PARALLEL SYSTEM AND ZERO FEED-IN CONTROL METHOD THEREFOR

CROSS-REFERENCE TO RELATED APPLICATION

This application claims the priority benefit of China application no. 202110900534.X, filed on Aug. 6, 2021. The entirety of the above-mentioned patent application is hereby incorporated by reference herein and made a part of this specification.

BACKGROUND

Technical Field

The disclosure relates to the technical field of inverters, and in particular, relates to an inverter parallel system and a zero feed-in control method for the inverter parallel system.

Description of Related Art

The general requirements of the household energy storage system for the energy management system include: self-consumption, time of use, zero feed-in, power backing up, and other functions. Taking the non-export (zero feed-in) function as an example, in addition to China, other countries also have regulatory requirements for zero feed-in, such as the Net Energy Metering (NEM) plan in North America, which requires user equipment to be equipped with zero feed-in capabilities. Generally, in order to achieve zero feed-in, a current transducer (CT) is required to be installed on the electrical grid side to obtain the grid-connected current data (also referred to as feed-in current data). The principle of zero feed-in control is: when an inverter detects a feed-in current, the inverter reduces the output power through measures such as derating, and regulates the feed-in current to zero (allowing current absorption from the electrical grid) when the demand for load power supply is met.

In order to achieve zero feed-in control, each inverter is provided with its own CT. As shown in FIG. 1, an inverter 1 is equipped with CT1, and an inverter 2 is equipped with CT2. However, since the sampling points are in the same position and the regulation amounts are independent of each other, the control of the two systems may conflict, and the systems cannot operate in the optimal state.

In order to solve the above problems, the conventional approach is to allow an energy management system 20 to be added. As shown in FIG. 2, the energy management system 20 obtains the electrical grid current through an electricity meter 21, establishes communication with both the inverter 1 and the inverter 2, and achieves the system energy management by means of communication. Further, as shown in FIG. 3, both the inverter 1 and the inverter 2 are equipped with CTs. The energy management system 20 establishes communication with both the inverter 1 and the inverter 2, obtains the feed-in current data through communication, and then achieves zero feed-in through centralized energy management.

As described above, in the related art, for the zero feed-in control of the inverter parallel system, the power scheduling of each inverter is achieved by adding communication to each inverter. However, the addition of communication requires the installation of communication lines, and disadvantages such as high installation difficulty and considerable system costs may thus be encountered.

SUMMARY

In order to solve one of the technical problems as described above, the disclosure provides the following technical solutions.

In the first aspect of the disclosure, an inverter parallel system is provided, and the inverter parallel system includes at least one first inverter, at least one second inverter, a load, an electrical grid, a controller, and an electrical parameter measuring device. The controller includes a system control module, and the first inverter includes an inverter control module.

The first inverter is connected to an energy storage battery, and the second inverter is connected to a renewable energy power generation device.

An input end of the controller is connected to the electrical parameter measuring device, and an output end of the controller is connected to the first inverter.

The system control module is configured to determine a battery power reference value of the energy storage battery according to an electrical grid current reference value and an electrical grid current sampling value. The electrical grid current reference value is a periodic pulse sequence with an adjustable duty cycle and amplitude.

The inverter control module is configured to control the first inverter according to the battery power reference value, a battery power sampling value, and an output current sampling value of the first inverter, such that a feed-in current flowing into the electrical grid side is zero, and the second inverter operates in a maximum power point tracking state.

In addition, the inverter parallel system according to the above embodiments of the disclosure may also have the following additional technical features.

According to an embodiment of the disclosure, the controller further includes a sampling and processing module and an interaction module.

An input end of the sampling and processing module is connected to the electrical parameter measuring device, and an output end of the sampling and processing module is connected to the system control module.

The sampling and processing module is configured to sample and process a current value measured by the electrical parameter measuring device to obtain the electrical grid current sampling value.

The controller communicates with the first inverter through the interaction module.

According to an embodiment of the disclosure, the electrical parameter measuring device includes at least one current transducer (CT).

When the electrical parameter measuring device includes one CT, the CT is connected to both the controller and the second inverter.

When the electrical parameter measuring device includes two CTs, one CT is connected to the controller, and the other CT is connected to the second inverter.

According to an embodiment of the disclosure, the system control module includes a first current regulator.

The first current regulator is configured to perform battery power regulation by treating the electrical grid current reference value as a given value and treating the electrical grid current sampling value as a feedback value and output the battery power reference value.

According to an embodiment of the disclosure, the inverter control module includes a battery power regulator and a second current regulator.

The battery power regulator is configured to perform battery power regulation by treating the battery power reference value as a given value and treating the battery power sampling value as a feedback value and output an output current reference value of the first inverter.

The second current regulator is configured to perform output current regulation by treating the output current reference value as a given value and treating the output current sampling value of the first inverter as a feedback value until a current actually outputted by the first inverter reaches the output current reference value.

According to an embodiment of the disclosure, when the inverter control module controls the first inverter, the second inverter operates in the maximum power point tracking state, or the second inverter transitions from a non-maximum power point tracking state to the maximum power point tracking state.

According to an embodiment of the disclosure, the controller is independent of the first inverter, or the controller is integrated in the first inverter.

In the second aspect of the disclosure, a zero feed-in control method for an inverter parallel system is provided, and the method includes the following steps.

In S1, an electrical grid current reference value, an electrical grid current sampling value, a battery power sampling value, and an output current sampling value of a first inverter are obtained. The electrical grid current reference value is a periodic pulse sequence with an adjustable duty cycle and amplitude, and the first inverter is connected to an energy storage battery.

In S2, a battery power reference value of the energy storage battery is determined according to the electrical grid current reference value and the electrical grid current sampling value.

In S3, the first inverter is controlled according to the battery power reference value, the battery power sampling value, and the output current sampling value, such that a feed-in current flowing into an electrical grid side is zero, and a second inverter operates in a maximum power point tracking state. The second inverter is connected to a renewable energy power generation device.

In addition, the inverter parallel system according to the above embodiments of the disclosure may also have the following additional technical features.

According to an embodiment of the disclosure, the step of determining the battery power reference value of the energy storage battery according to the electrical grid current reference value and the electrical grid current sampling value further includes the following step. The electrical grid current reference value treated as a given value and the electrical grid current sampling value treated as a feedback value are inputted to a first current regulator, battery power regulation is performed, and the battery power reference value is obtained.

According to an embodiment of the disclosure, the step of controlling the first inverter according to the battery power reference value, the battery power sampling value, and the output current sampling value further includes the following steps. The battery power reference value treated as a given value and the battery power sampling value treated as a feedback value are inputted to a battery power regulator, battery power regulation is performed, and the output current reference value of the first inverter is obtained. The output current reference value treated as a given value and the output current sampling value treated as a feedback value are inputted to a second current regulator, and output current regulation is performed until a current actually outputted by the first inverter reaches the output current reference value.

Therefore, in the technical solutions provided by the embodiments of the disclosure, zero feed-in control may be achieved without energy management and without communication between inverters. By treating the given pulse sequence as the electrical grid current reference value, the inverter connected to the energy storage battery is controlled according to the electrical grid current reference value. Such that a feed-in current flowing into the electrical grid side is zero, and the second inverter operates in the maximum power point tracking state, that is, the inverter parallel system is in the optimal state. Therefore, the need for installation of communication lines in the conventional wired communication is eliminated, system costs and installation difficulty are reduced, and the system can operate in the optimal state.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 11 is a schematic graph of a theoretical operating waveform in still another example according to the disclosure.

FIG. 12 is a flow chart of a zero feed-in control method for an inverter parallel system according to an embodiment of the disclosure.

DESCRIPTION OF THE EMBODIMENTS

Description will now be made in detail to clearly and completely present preferred embodiments of the disclosure, examples of which are illustrated in the accompanying drawings. Nevertheless, the disclosed embodiments are merely part of the embodiments of the disclosure, not all the embodiments. Based on the embodiments of the disclosure, all other embodiments obtained by a person having ordinary skill in the art without making any inventive effort fall within the scope that the disclosure seeks to protect.

It should be noted that, for zero feed-in control of inverter parallel systems, no good design solutions are currently provided, except for adding communication to achieve power scheduling for each inverter. However, the addition of communication requires the installation of communication lines, and disadvantages such as high installation difficulty and considerable system costs may thus be encountered. Based on the above, the disclosure provides a zero feed-in control method that is applied to an inverter parallel system without communication (between inverters), and system costs and installation difficulty may thus be reduced.

Figure 4:
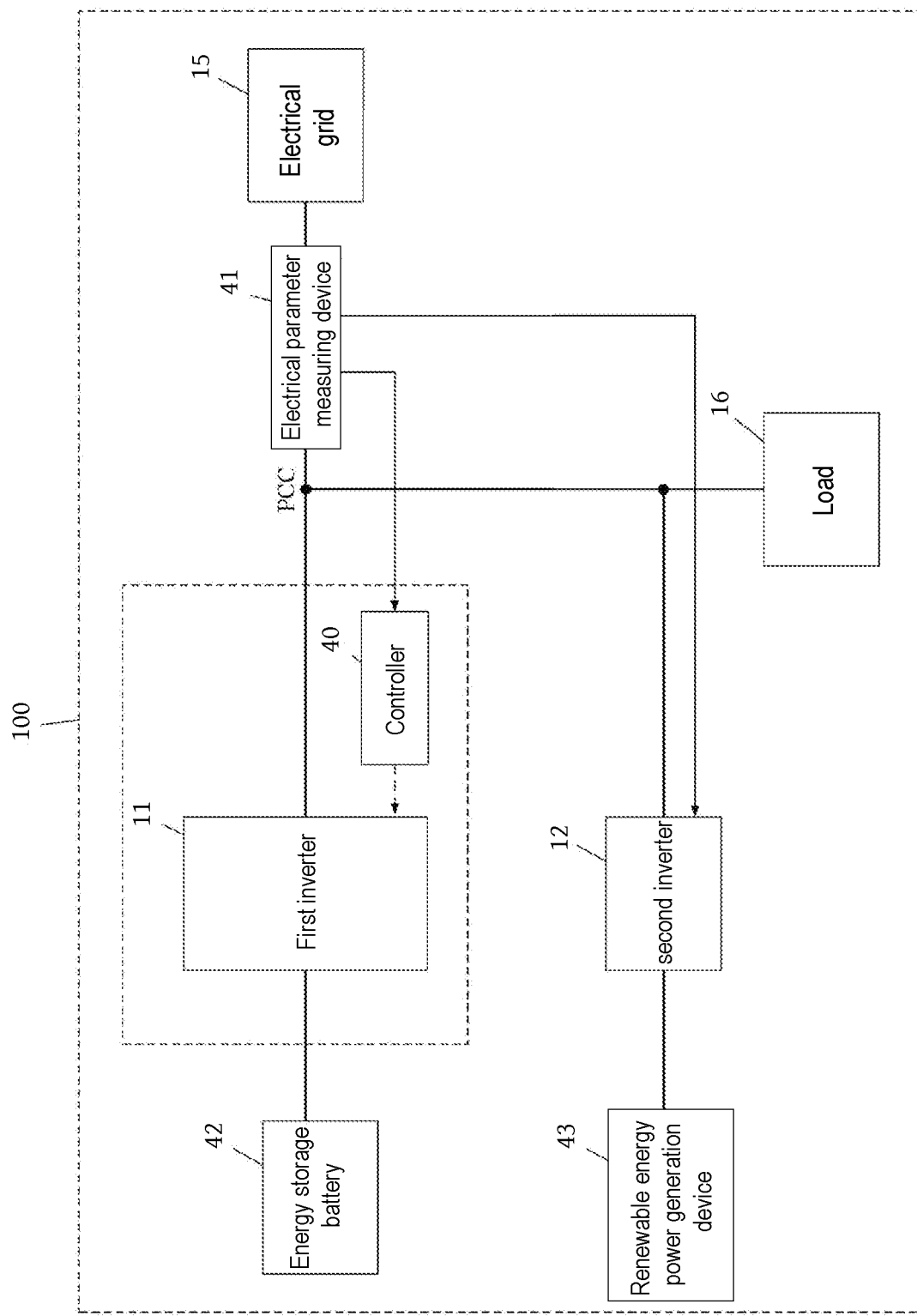
FIG. 4 is a schematic diagram of a structure of an inverter parallel system according to an embodiment of the disclosure.

FIG. 4 is a schematic diagram of a structure of an inverter parallel system according to an embodiment of the disclosure.

Figure 1:
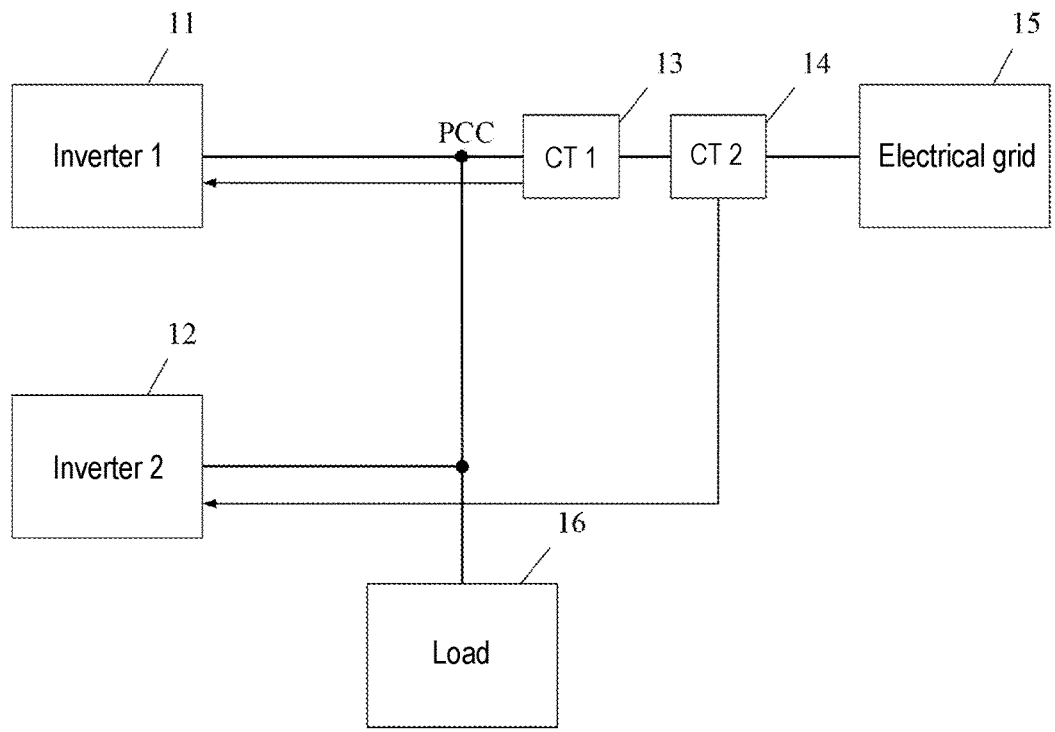
FIG. 1 is a schematic diagram of a structure of an inverter parallel system according to the related art.
Figure 2:
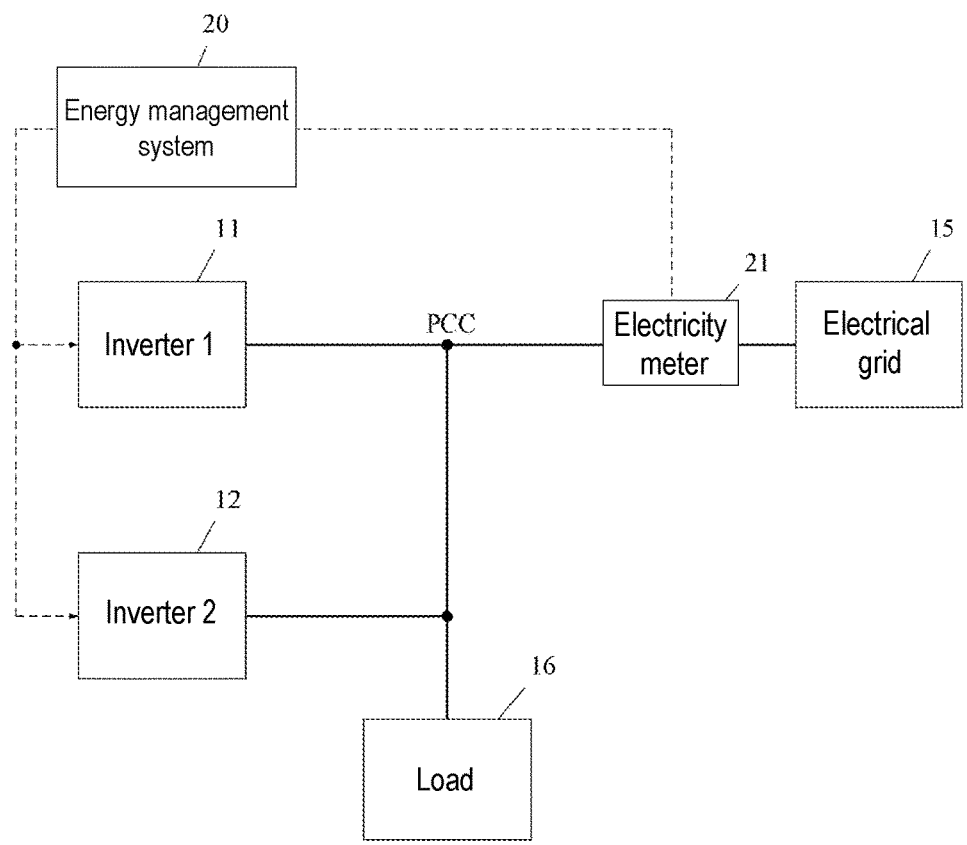
FIG. 2 is a schematic diagram of a structure of another inverter parallel system according to the related art.
Figure 3:
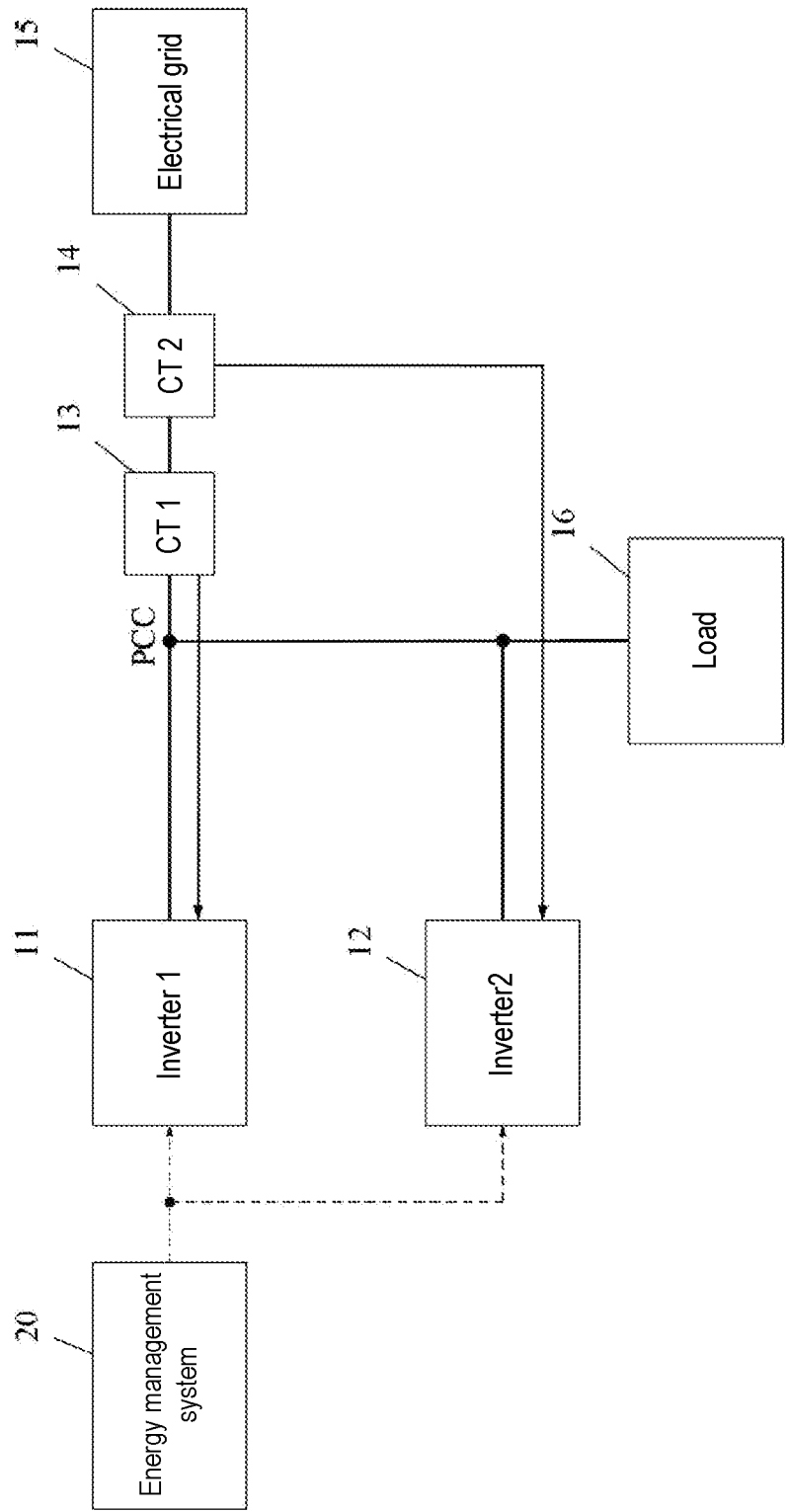
FIG. 3 is a schematic diagram of a structure of still another inverter parallel system according to the related art.

As shown in FIG. 4, an inverter parallel system 100 includes at least one first inverter 11, at least one second inverter 12, an electrical grid 15, a load 16, a controller 40, and an electrical parameter measuring device 41. The controller 40 includes a system control module (not shown in FIG. 1), and the first inverter 11 includes an inverter control module (not shown in FIG. 1).

The first inverter 11 is connected to an energy storage battery 42, and the second inverter 12 is connected to a renewable energy power generation device 43. An input end of the controller 40 is connected to the electrical parameter measuring device 41, and an output end of the controller 40 is connected to the first inverter 11. The system control module is configured to determine a battery power reference value of the energy storage battery 42 according to an electrical grid current reference value and an electrical grid current sampling value. The electrical grid current reference value is a periodic pulse sequence with an adjustable duty cycle and amplitude. The inverter control module is configured to control the first inverter 11 according to the battery power reference value, a battery power sampling value, and an output current sampling value of the first inverter 11, such that a feed-in current flowing into the electrical grid side is zero, and the second inverter 12 operates in a maximum power point (maximum power point of the renewable energy power generation device 43) tracking state.

The electrical grid current reference value may be understood as the current value that needs to be reached on the electrical grid side. In the embodiments of the disclosure, a periodic pulse sequence with an adjustable duty cycle and amplitude is treated as the electrical grid current reference value (given value). The pulse sequence may be obtained through many experiments, or determined based on historical experience, or determined according to specific actual needs, for example, the period of the given pulse sequence may be 1 second and the duty cycle may be 5%. The electrical grid current sampling value may be understood as the actual current value sampled on the electrical grid side.

The battery power reference value may be understood as the power that the energy storage battery 42 needs to achieve, which is a theoretical value. The battery power sampling value may be the actual power obtained by detecting the power of the energy storage battery 42.

The output current sampling value of the first inverter 11 may be an actual value of the output current obtained by detecting the output current of the first inverter 11.

It is understandable that when the inverter is in the maximum power point tracking (MPPT) state, for example, when the inverter is connected to a photovoltaic array, the inverter may regulate the output power of the photovoltaic array according to the characteristics of different ambient temperatures and light intensity. In this way, the photovoltaic array always outputs the maximum power without wasting green energy.

In the embodiments of the disclosure, the priority order of power supply to the load 16 is the renewable energy power generation device 43, the energy storage battery 42, and the electrical grid 15. The renewable energy power generation device 43 is configured to convert renewable energy (solar energy, wind energy, and other renewable energy) into electrical energy and uses the electrical energy to provide energy to the load 16. The energy storage battery 42 is configured to store excess electrical energy generated by the renewable energy power generation device 43 for later use (e.g., when the renewable energy is insufficient to provide electrical energy to the load 16), and the electricity costs of the user may be reduced to a certain extent. Control such as "making excess electrical energy generated by the renewable energy power generation device 43 stored in the energy storage battery 43 instead of being fed into the electrical grid 15" may be referred to as zero feed-in (making the current fed into the electrical grid zero) control. Compared to the conventional zero feed-in control which is achieved through energy management, in the embodiments of the disclosure, as the first inverter 11 is provided with the controller 40, the controller 40 communicates with the first inverter 11 but does not interact with the second inverter 12, and further, the system control module is provided in the first inverter, the zero feed-in control is thereby achieved through the controller and the system control module. Therefore, energy management is not required, the need for installation of communication lines in the conventional wired communication is eliminated, and installation is also simplified.

To be specific, in practical applications, a pulse sequence may be determined and obtained first, and the pulse sequence may be treated as the electrical grid current reference value. When a feed-in current is detected, the electrical grid current sampling value may be obtained by sampling the feed-in current value on the electrical grid side through the electrical parameter measuring device 41. The electrical grid current reference value and the electrical grid current sampling value are inputted to the controller 40, so that the controller 40 determines the battery power reference value of the energy storage battery 42 according to the electrical grid current reference value and the electrical grid current sampling value. The battery power reference value is inputted to the first inverter 11, so that the inverter control module in the first inverter 11 controls the first inverter 11 according to the battery power reference value, the battery power sampling value, and the output current sampling value of the first inverter 11, such that the inverter parallel system 100 operates in an optimal state. Herein, the optimal state refers to a state where the feed-in current flowing into the electrical grid side is zero, and the second inverter 12 operates in the maximum power point (maximum power point of the renewable energy power generation device 43) tracking state.

After the first inverter 11 is controlled, the system 100 is in the optimal state, (the feed-in current is zero and the second inverter 12 operates in the maximum power point tracking state). That is, in the process of controlling the first inverter 11, the second inverter 12 may always operate in the maximum power point tracking state or may operate in other states, for example, the second inverter 12 may transition from not operating in the maximum power point tracking state to operating in the maximum power point tracking state. It can be understood that when the second inverter 12 operates in the maximum power point tracking state, the renewable energy connected to it may be fully utilized.

It should be noted that, in the related art, when the zero feed-in control is performed, the phenomenon that the feed-in current is zero, but the renewable energy power generation device 43 does not operate at the maximum power point is likely to occur. For instance, the renewable energy power generation device 43 operates at 3 kW, and its maximum power is 5 kW, but at the moment, because the feed-in current is zero, the renewable energy power generation device 43 charges the energy storage battery by 3 kW, so at the moment, the system is not in the optimal state. In contrast, in the technical solutions provided by the embodiments of the disclosure, a periodically changing pulse sequence is given as the electrical grid current reference value. Further, the first inverter 11 is controlled through the controller and the system control module according to the pulse sequence, so that the first inverter 11 changes the absolute value of power in response to the pulse sequence until the feed-in current flowing into the electrical grid side is zero, and at the moment, the system 100 is in the optimal state. That is, the second inverter 12 operates in the maximum power point tracking state.

That is, in the embodiments of the disclosure, when the inverter parallel system 100 performs the zero feed-in control, the zero feed-in may be achieved on the basis of low costs and low installation difficulty, and further, by periodically changing the electrical grid current reference value, an effective disturbance may also be achieved. The disturbance signal can gradually regulate the operating point of the inverter parallel system to the optimal state, for example, all inverters are regulated from non-maximum power point tracking (MPPT) to MPPT. When the system reaches the optimal state, the disturbance behavior may not affect the existing optimal state of the system.

Therefore, in the inverter parallel system provided by the embodiments of the disclosure, zero feed-in control may be achieved without energy management and without communication between inverters. Therefore, the need for installation of communication lines in the conventional wired communication is eliminated, system costs and installation difficulty are reduced, and the system can operate in the optimal state.

Figure 5:
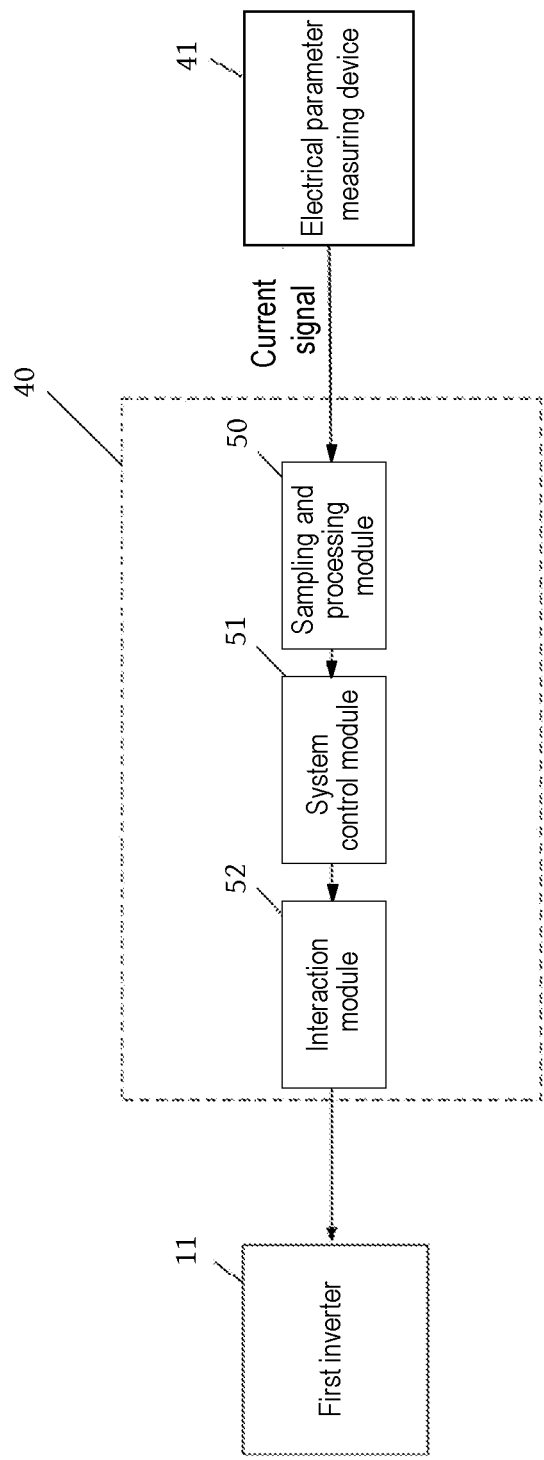
FIG. 5 is a schematic diagram of a structure of a controller according to an embodiment of the disclosure.

In an embodiment of the disclosure, as shown in FIG. 5, the controller 40 may further include a sampling and processing module 50 and an interaction module 52.

Herein, an input end of the sampling and processing module 50 is connected to the electrical parameter measuring device 41, and an output end of the sampling and processing module 50 is connected to the system control module 51. The sampling and processing module 50 is configured to sample and process a current value measured by the electrical parameter measuring device 41 to obtain and input the electrical grid current sampling value to the system control module 51. The controller 40 communicate with the first inverter 11 through the interaction module 52.

Further, the controller 40 may be independent of the first inverter 11, or the controller 40 may be integrated in the first inverter 11.

That is, the controller 40 may be integrated in the first inverter 11, or may be an external independent controller that establishes contact with the first inverter 11 through communication. If the controller 40 is integrated in the first inverter 11, the first inverter 11 is required to include the sampling and processing module 50 and the system control module 51.

Figure 6:
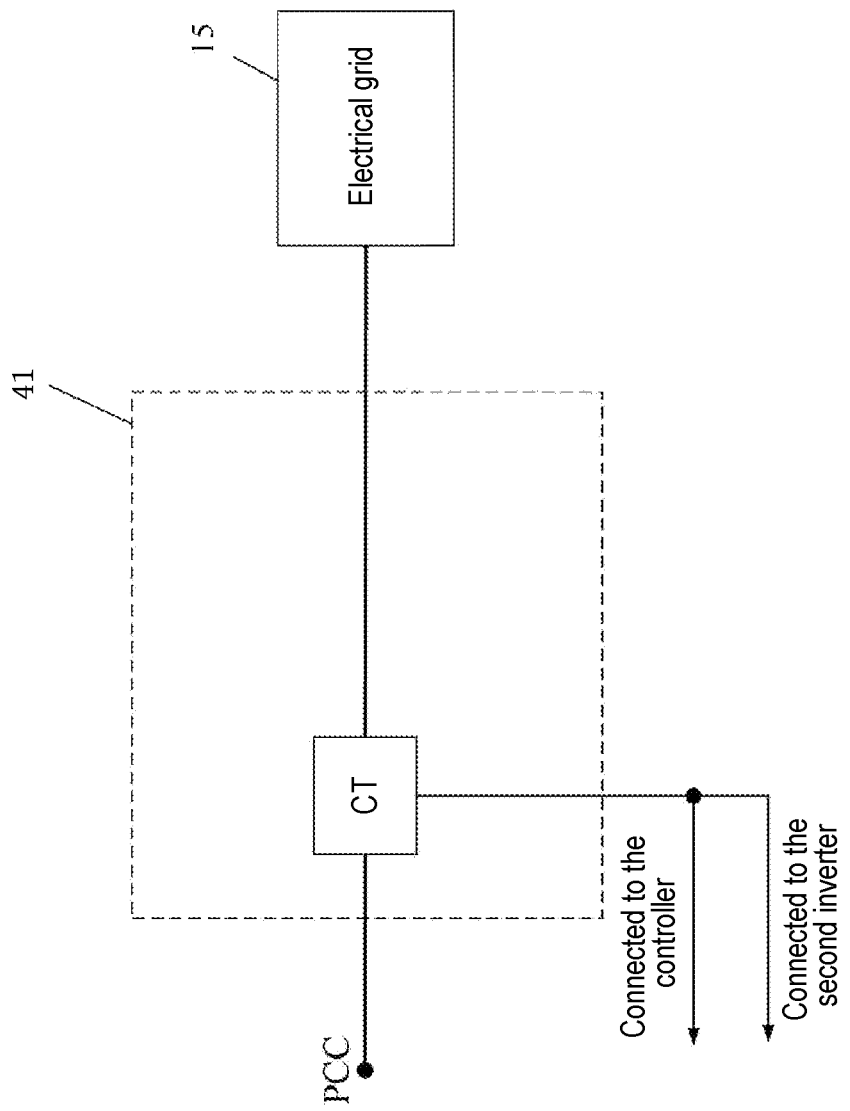
FIG. 6 is a schematic diagram of a structure of an electrical parameter measuring device according to an embodiment of the disclosure.
Figure 7:
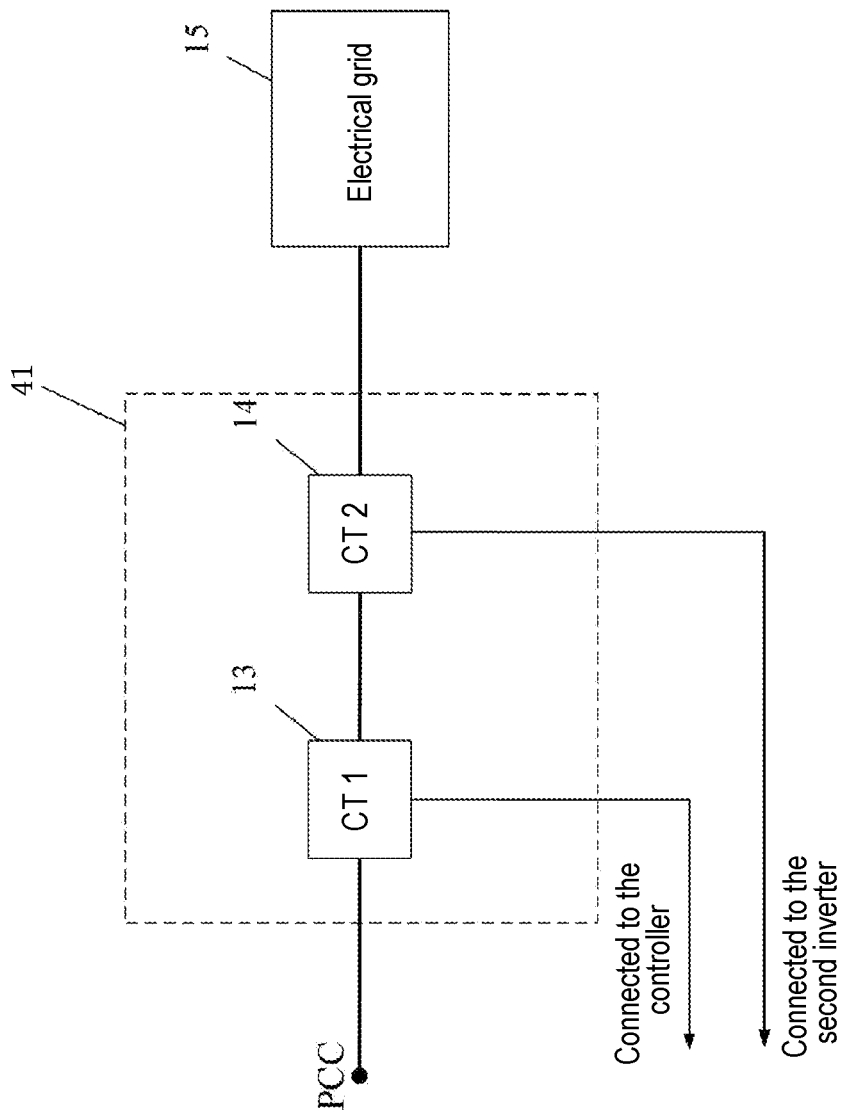
FIG. 7 is a schematic diagram of the structure of the electrical parameter measuring device according to another embodiment of the disclosure.

In an embodiment of the disclosure, the electrical parameter measuring device 41 may include at least one current transducer (CT). As shown in FIG. 6, when the electrical parameter measuring device 41 includes one CT, the CT is connected to both the controller 40 and the second inverter 12. As shown in FIG. 7, when the electrical parameter measuring device 41 includes two CTs, one CT1 (13) is connected to the controller, and the other CT2 (14) is connected to the second inverter 12.

Figure 8:
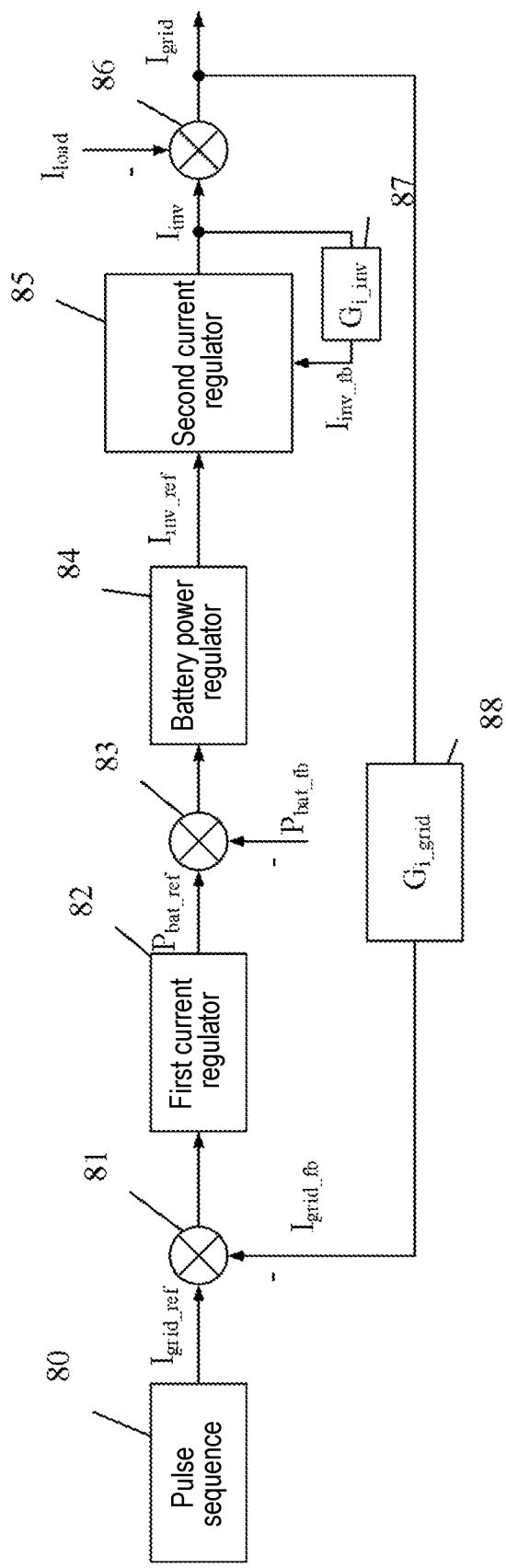
FIG. 8 is a block diagram of an algorithm for performing zero feed-in control on the inverter parallel system according to an embodiment of the disclosure.

In an embodiment of the disclosure, as shown in FIG. 8, the system control module may include a first current regulator 82. The first current regulator 82 is configured to perform battery power regulation by treating the electrical grid current reference value as a given value and treating the electrical grid current sampling value as a feedback value and output the battery power reference value.

Further, as shown in FIG. 8, the inverter control module may include a battery power regulator 84 and a second current regulator 85. The battery power regulator is configured to perform battery power regulation by treating the battery power reference value as a given value and treating the battery power sampling value as a feedback value and output an output current reference value of the first inverter. The second current regulator is configured to perform output current regulation by treating the output current reference value as a given value and treating the output current sampling value of the first inverter as a feedback value until a current actually outputted by the first inverter reaches the output current reference value.

To be specific, with reference to FIG. 8, first, a periodically changing pulse sequence 80 is obtained, and an electrical grid current $I_{grid}$ is sampled to obtain an electrical grid voltage sampling value $I_{grid\_fb}$. The battery power is detected and processed to obtain a battery power sampling value $P_{bat\_fb}$, and the output current of the first inverter 11 is detected and processed to obtain an output current sampling value $I_{inv\_fb}$. Next, the pulse sequence 80 is treated as an electrical grid voltage reference value $I_{grid\_ref}$, the $I_{grid\_ref}$ is treated as a given value, and the $I_{grid\_fb}$ is treated as a feedback value to be inputted to a first adder 81. The first adder 81 then determines a difference between the $I_{grid\_ref}$ and the $I_{grid\_fb}$ and outputs the difference into the first current regulator 82. The first current regulator 82 then regulates the power of the energy storage battery 42 according to the difference to output a battery power reference value $P_{bat\_ref}$. The $P_{bat\_ref}$ is treated as a given value, and the $P_{bat\_fb}$ is treated as a feedback value to be inputted to a second adder 83. The second adder 83 then determines a difference between the $P_{bat\_ref}$ and the $P_{bat\_fb}$ and outputs the difference into the battery power regulator 84. The battery power regulator 84 then regulates the output current of the first inverter 11 according to the difference to output an output current reference value $I_{inv\_ref}$ of the first inverter 11. The $I_{inv\_ref}$ is treated as a given value, and the $I_{inv\_fb}$ is treated as a feedback value to be inputted to the second current regulator 85. The second current regulator 85 then regulates the output current according to the difference between the two to control the output current of the first inverter 11 to reach $I_{inv\_ref}$, and in this way, the system 100 is in the optimal state, (the feed-in current is zero and the second inverter 12 operates in the maximum power point tracking state).

Note that when regulation is performed according to the difference, the regulation may be performed according to any feasible technology in the related art. For instance, such may be PI (proportional-integral) regulation or may be PID (proportional-integral-derivative) regulation, which is not limited in this embodiment of the disclosure.

In general, in the technical solutions of the embodiments of the disclosure, an effective disturbance is achieved by periodically changing the electrical grid current reference value. When the system is not in the optimal state, the disturbance signal may gradually regulate the operating point of the inverter parallel system to the optimal state. When the system reaches the optimal state, the disturbance signal can keep the operation of the inverter parallel system in the optimal state. After the system reaches the optimal state, the disturbance behavior may not affect the existing optimal state of the system.

The following three examples are provided for verification.

Figure 9:
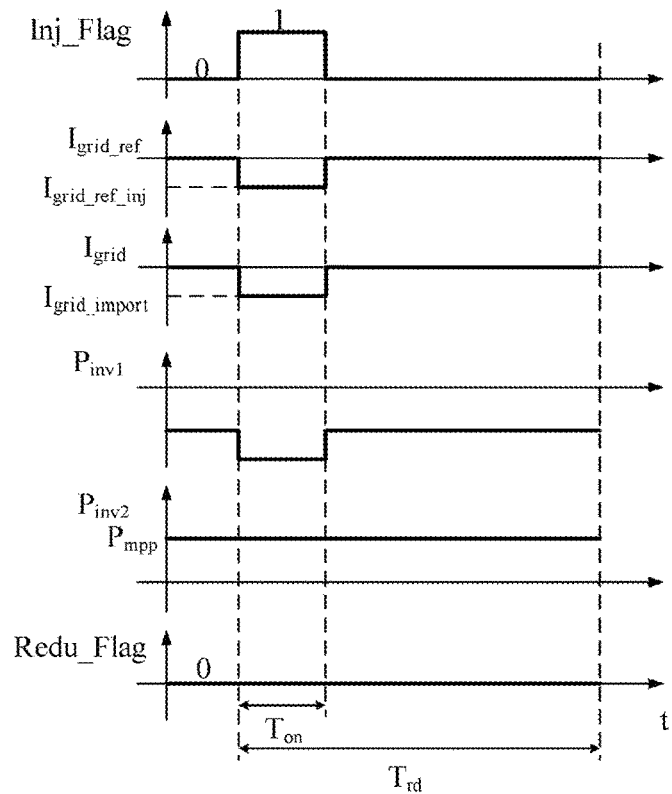
FIG. 9 is a schematic graph of a theoretical operating waveform in an example according to the disclosure.

Taking the first inverter 11 connected to the energy storage battery and the second inverter 12 connected to a photovoltaic panel as an example, with reference to the theoretical operating waveform 1 shown in FIG. 9, the waveform depicts the influence of periodic disturbances on the operation of the first inverter 11 and the second inverter 12 when the system is in the optimal state. Inj_Flag is a disturbance flag, when it is 0, it means no disturbance, and when it is 1, it means the disturbance is operating. When Inj_Flag is 1, the electrical grid current reference value $I_{grid\_ref}$ changes from 0 to $I_{grid\_ref}$, and the first inverter 11 responds to the given, and the absolute value of the power $P_{in1}$ of the first inverter 11 also increases. At this time, since the second inverter 12 is already operating in the optimal state ($P_{inv2}=P_{mpp}$ maximum power tracking point), $P_{inv2}$ does not change. During the disturbance process, the electrical grid current $I_{grid}$ changes from 0 to $I_{grid\_import}$, the current is the current absorbed from the electrical grid side and meets the requirements of zero feed-in. After the disturbance lasts for $T_{on}$ time, Inj_Flag returns to 0, $I_{grid\_ref}$ returns to 0, the first inverter 11 responds to the given, and the absolute value of the power $P_{inv1}$ becomes smaller. During the entire process, a power limit flag Redu_Flag of the second inverter 12 remains 0 all the time.

Taking the first inverter 11 connected to the energy storage battery and the second inverter 12 connected to the photovoltaic panel as an example, with reference to the theoretical operating waveform 2 shown in FIG. 11 provided by the disclosure, the waveform depicts the influence of periodic disturbances on the operation of the first inverter 11 and the second inverter 12 when the system is in a non-optimal state. Inj_Flag is the disturbance flag, when it is 0, it means no disturbance, and when it is 1, it means the disturbance is operating. When Inj_Flag is 1, $I_{grid\_ref}$ changes from 0 to $I_{grid\_ref\_inj}$, and the first inverter 11 responds to the given, and the absolute value of $P_{inv1}$ also increases. At this time, since the second inverter 12 does not reach the optimal state ($P_{inv2}$ is not equal to $P_{mpp}$), $P_{inv2}$ begins to tend towards $P_{mpp}$. During the disturbance process, the grid current $I_{grid}$ does not change to $I_{grid\_import}$, but a small range of power fluctuations occurs, which meets the requirements of zero feed-in. After the disturbance lasts for $T_{on}$ time, Inj_Flag returns to 0, $I_{grid\_ref}$ returns to 0, and the first inverter 11 and the second inverter 12 are maintained at the new operating point. During the entire process, the power limit flag Redu_Flag of the second inverter 12 remains 1 all the time.

Figure 10:
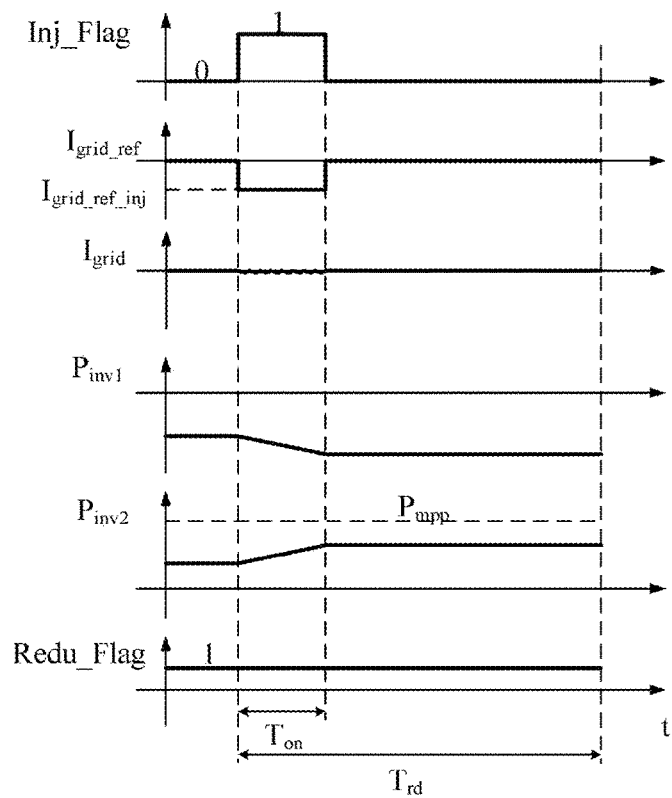
FIG. 10 is a schematic graph of a theoretical operating waveform in another example according to the disclosure.

Taking the first inverter 11 connected to the energy storage battery and the second inverter 12 connected to the photovoltaic panel as an example, with reference to the theoretical operating waveform 3 shown in FIG. 12 provided by the disclosure, the waveform depicts the influence of periodic disturbances on the operation of the first inverter 11 and the second inverter 12 during the transition process of the system from the non-optimal state to the optimal state. In a first disturbance period $T_{rd\_1}$ and a second disturbance period $T_{rd\_2}$, the system is in the regulation process. During this time period, the power limit flag Redu_Flag of the second inverter 12 is 1, and its operating waveform is consistent with FIG. 10. During the time period of a third disturbance period $T_{rd\_3}$, the system is already in the optimal operating state. During this time period, the power limit flag Redu_Flag of the second inverter 12 is 0, and its operating waveform is consistent with FIG. 9.

From the above three examples, it can be seen that when the first inverter connected to the energy storage battery is controlled by a periodic disturbance, that is, a pulse sequence, regardless of whether the current system is in the optimal state or the non-optimal state, the system may be kept in the optimal state or may be gradually regulated to the optimal state. That is, through the control of the first inverter, it can be ensured that the system operates in the optimal state, so that renewable energy sources such as solar energy and wind energy may be fully utilized.

To sum up, the inverter parallel system according to the embodiments of the disclosure has the following advantages. Energy management is not required, the structure is simple, the system costs can be reduced, and the zero feed-in control can be achieved without communication between inverters. The need for installation of communication lines in the conventional wired communication is eliminated, the installation is simplified, and the system development cycle can be shortened. By realizing an effective disturbance, the operating point of the inverter parallel system may be gradually regulated to the optimal state, and the full utilization of green energy may be realized.

In response to the inverter parallel system provided in the embodiments, the disclosure further provides a zero feed-in control method for an inverter parallel system.

FIG. 12 is a schematic block diagram of a zero feed-in control method for an inverter parallel system according to an embodiment of the disclosure.

As shown in FIG. 12, the method includes the following steps S1 to S4.

In S1, a first inverter connected to an energy storage battery and a second inverter connected to a renewable energy power generation device in the inverter parallel system are determined.

In the embodiments of the disclosure, the inverter connected to the energy storage battery is referred to as the first inverter, and the inverter connected to the renewable energy power generation device is referred to as the second inverter.

In S2, an electrical grid current reference value, an electrical grid current sampling value, a battery power sampling value, and an output current sampling value of the first inverter are obtained. The electrical grid current reference value is a periodic pulse sequence with an adjustable duty cycle and amplitude.

In S3, a battery power reference value of the energy storage battery is determined according to the electrical grid current reference value and the electrical grid current sampling value.

In S4, the first inverter is controlled according to the battery power reference value, the battery power sampling value, and the output current sampling value, such that a feed-in current flowing into the electrical grid side is zero, and the second inverter operates in a maximum power point tracking state.

To be specific, in actual applications, in the inverter parallel system to be controlled, first, the first inverter connected to the energy storage battery and the second inverter connected to the renewable energy power generation device in the inverter parallel system are determined. The electrical grid current reference value, the electrical grid current sampling value, the battery power sampling value, and the output current sampling value of the first inverter are then obtained. Next, the battery power reference value of the energy storage battery is determined according to the electrical grid current reference value and the electrical grid current sampling value. The first inverter is then controlled according to the battery power reference value, the battery power sampling value, and the output current sampling value, such that the feed-in current flowing into the electrical grid side is zero, and the second inverter operates in the maximum power point tracking state.

In an embodiment, the step of determining the battery power reference value of the energy storage battery according to the electrical grid current reference value and the electrical grid current sampling value may include the following step. The electrical grid current reference value treated as a given value and the electrical grid current sampling value treated as a feedback value are inputted to the first current regulator, battery power regulation is performed, and the battery power reference value is obtained.

In an embodiment, the step of controlling the first inverter according to the battery power reference value, the battery power sampling value, and the output current sampling value may include the following steps. The battery power reference value treated as a given value and the battery power sampling value treated as a feedback value are inputted to the battery power regulator, battery power regulation is performed, and the output current reference value of the first inverter is obtained.

The output current reference value treated as a given value and the output current sampling value treated as a feedback value are inputted to the second current regulator, and output current regulation is performed until a current actually outputted by the first inverter reaches the output current reference value.

Note that for the specific implementation of the zero feed-in control method for the inverter parallel system, reference may be made to the specific implementation of the inverter parallel system, so detailed description thereof is not repeated herein to avoid redundancy.

In the zero feed-in control method for the inverter parallel system provided by the embodiments of the disclosure, zero feed-in control may be achieved without energy management and without communication between inverters. Therefore, the need for installation of communication lines in the conventional wired communication is eliminated, system costs and installation difficulty are reduced, and the system can operate in the optimal state.

In the description of the disclosure, the terms "first" and "second" are only used for descriptive purposes and cannot be understood as indicating or implying relative importance or implicitly indicating the number of indicated technical features. The term "plurality" means one or more than one unless specifically defined otherwise.

In the description of the specification, descriptions with reference to the terms such as "one embodiment", "some embodiments", "examples", "specific examples", or "some examples" etc. means that the specific features, structures, materials, or characteristics described in combination with the embodiment(s) or example(s) are included in at least one embodiment or example of the disclosure. Although the embodiments of the disclosure have been shown and described above, it can be understood that the abovementioned embodiments are exemplary and should not be construed as limiting the disclosure. A person having ordinary skill in the art may make changes, corrections, substitutions, and modifications to the abovementioned embodiments within the scope of the disclosure.

What is claimed is:

1. An inverter parallel system, comprising at least one first inverter, at least one second inverter, a load, an electrical grid, a controller, and an electrical parameter measuring device, wherein the controller comprises a system control module, and the at least one first inverter comprises an inverter control module, wherein
    the at least one first inverter is connected to an energy storage battery, and the at least one second inverter is connected to a renewable energy power generation device,
    an input end of the controller is connected to the electrical parameter measuring device, and an output end of the controller is connected to the at least one first inverter,
    the system control module is configured to determine a battery power reference value of the energy storage battery according to an electrical grid current reference value and an electrical grid current sampling value, wherein the electrical grid current reference value is a periodic pulse sequence with an adjustable duty cycle and amplitude,
    wherein the system control module comprises a first current regulator, and the first current regulator is configured to perform battery power regulation by treating the electrical grid current reference value as a given value and treating the electrical grid current sampling value as a feedback value and output the battery power reference value, and
    the inverter control module of the at least one first inverter is configured to control the at least one first inverter according to the battery power reference value, a battery power sampling value, and an output current sampling value of the at least one first inverter, such that a feed-in current flowing into the electrical grid side is zero, and the at least one second inverter operates in a maximum power point tracking state,
    wherein the inverter control module comprises a battery power regulator and a second current regulator,
    the battery power regulator is configured to perform battery power regulation by treating the battery power reference value as a given value and treating the battery power sampling value as a feedback value and output an output current reference value of the at least one first inverter, and
    the second current regulator is configured to perform output current regulation by treating the output current reference value as a given value and treating the output current sampling value of the at least one first inverter as a feedback value until a current actually outputted by the at least one first inverter reaches the output current reference value.

2. The inverter parallel system according to claim 1, wherein the controller further comprises a sampling and processing module and a communication interface, wherein an input end of the sampling and processing module is connected to the electrical parameter measuring device, an output end of the sampling and processing module is connected to the system control module, the sampling and processing module is configured to sample and process a current value measured by the electrical parameter measuring device to obtain the electrical grid current sampling value, and the controller communicates with the at least one first inverter through the communication interface.

3. The inverter parallel system according to claim 1, wherein the electrical parameter measuring device comprises at least one current transducer, when the electrical parameter measuring device comprises one current transducer, the current transducer is connected to both the controller and the at least one second inverter, and when the electrical parameter measuring device comprises two current transducers, one current transducer is connected to the controller, and the other current transducer is connected to the at least one second inverter.

4. The inverter parallel system according to claim 1, wherein when the inverter control module controls the at least one first inverter, the at least one second inverter operates in the maximum power point tracking state, or the at least one second inverter transitions from a non-maximum power point tracking state to the maximum power point tracking state.

5. The inverter parallel system according to claim 1, wherein the controller is independent of the at least one first inverter, or the controller is integrated in the at least one first inverter.

* * * * *